June 6, 1944.   O. R. FROST   2,350,602
MILKING MACHINE
Filed July 22, 1940   2 Sheets-Sheet 1

Inventor
Orley R. Frost
By
Attorneys

June 6, 1944. O. R. FROST 2,350,602
MILKING MACHINE
Filed July 22, 1940 2 Sheets-Sheet 2
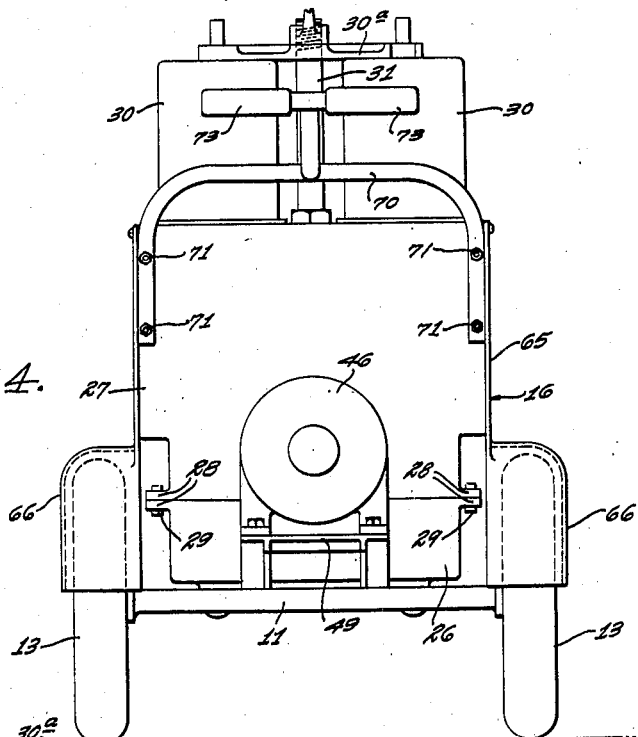
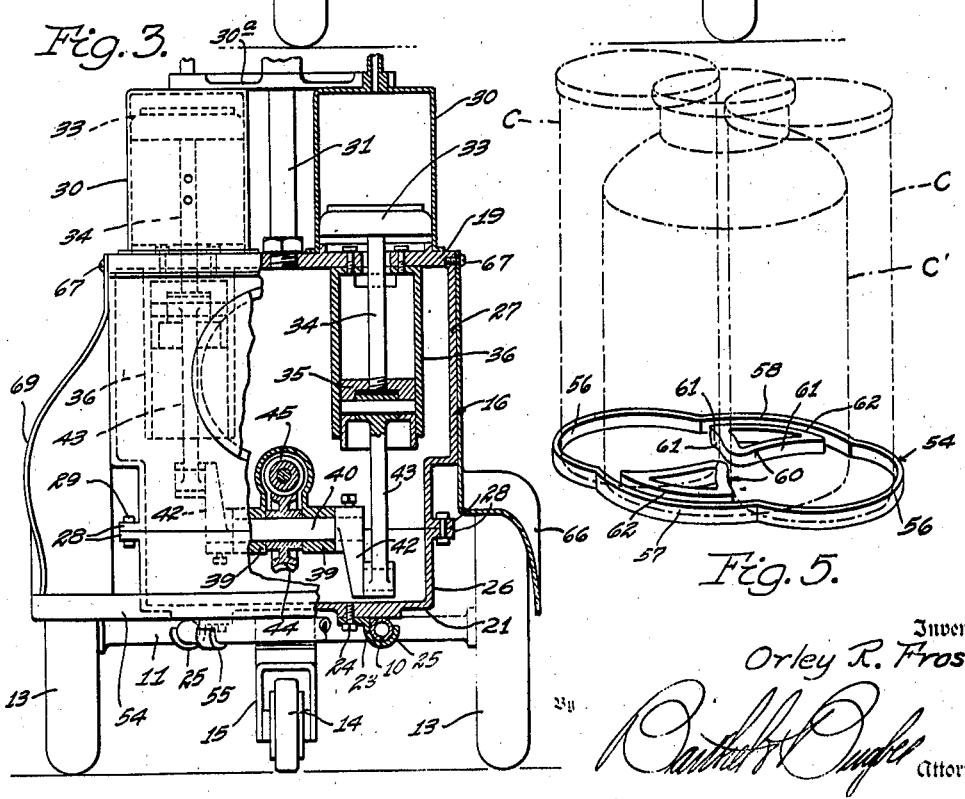
Inventor
Orley R. Frost
Attorneys Patented June 6, 1944

2,350,602

UNITED STATES PATENT OFFICE 2,350,602

MILKING MACHINE

Orley R. Frost, Port Huron, Mich.

Application July 22, 1940, Serial No. 346,677

4 Claims. (Cl. 31—73)

This invention relates generally to milking machines and more particularly to portable milking machines.

It is an object of the present invention to provide a new and improved portable milking machine which may be easily manipulated from place to place and one which is strong and durable.

Another object of the invention is to provide a portable milking machine having a new and improved arrangement of the several units or devices thereof to provide a compact machine having the said various units readily accessible and convenient for the operator.

Another object of the invention is to provide for a portable milking machine a new and improved platform having provisions for retaining thereon one or more milk or cream containers.

Other objects of the invention will become apparent from the following detailed description taken in connection with the accompanying drawings, in which:

Figure 3 is a front view of the machine partly broken away and in section to show certain parts of the operating mechanism thereof;

Figure 4 is a rear view of the machine; and

Figure 5 is a perspective view of a milk container platform with the containers shown in dot and dash lines to illustrate how one or more of such containers may be supported on the platform.

Figure 1:
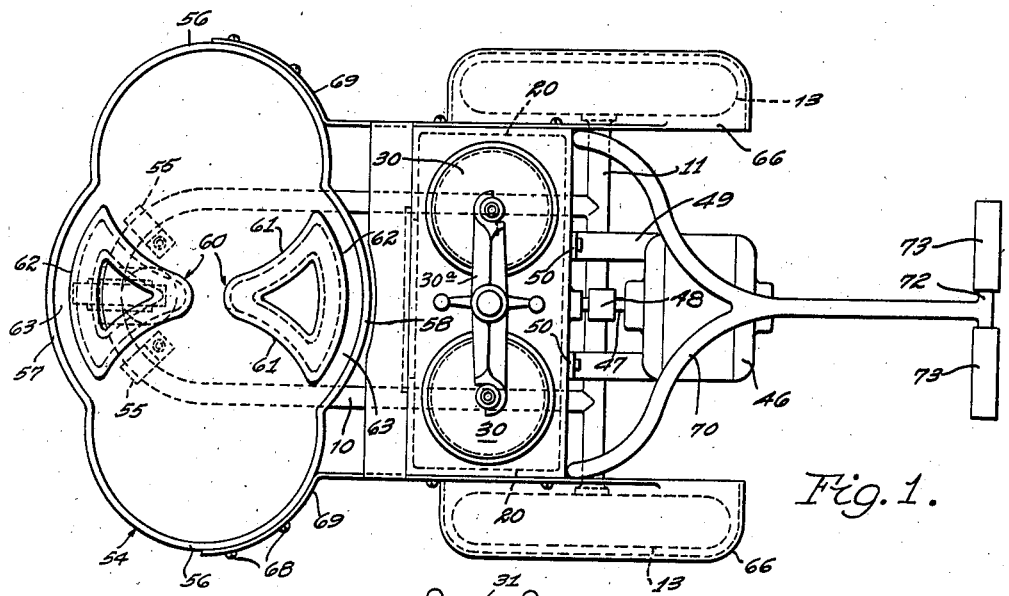
Figure 1 is a top plan view of the portable milking machine.

Referring to the drawings by characters of reference, the machine includes a substantially horizontal, U-shaped frame 10 having rearwardly directed ends rigidly secured, such as by a welding operation, to a transversely extending rear axle housing 11. The frame 10 and the housing 11 are preferably of tubular form to provide a strong and rigid frame structure. Journaled within the housing 11, a suitable rear axle 12 is supported by rear ground engaging wheels 13 which are preferably provided with rubber tires. In order to provide a portable milking machine which may be easily and conveniently moved from place to place, I provide a single wheel or caster 14 for supporting the front end of the frame 10, the caster 14 being disposed centrally of the frame. The caster 14 may be of any suitable type and may have its axle rotatably supported in the spaced side members of a U-shaped bracket 15 which may be pivoted to a bearing plate 15a which is rigidly secured to the front or rounded end of the U-shaped frame.

Mounted on the frame 10 there is a substantially rectangular housing 16 having a front wall 17, a rear wall 18, a top wall 19, side walls 20 and a bottom wall 21. As shown in Figure 3, the housing bottom wall 21 rests upon the side rails of the U-shaped frame 10 and is held against lateral movement relative to the frame by means of retaining brackets 23 which may be rigidly secured to the casing bottom wall 21 by screws 24 or by other suitable means. As shown in Figure 3, the brackets 23 are secured to the casing bottom wall 21 inwardly of the longitudinal sides of the frame 10 and have depending upwardly facing sockets 25 in which the frame members are received. The housing 16 is preferably constructed of a lower section 26 and an upper section 27, which sections are provided with outturned flanges 28 to receive nuts and bolts 29 for rigidly securing the sections together.

Mounted externally of the housing 16 on the top wall 19 thereof, a pair of laterally spaced, removable vacuum heads or cylinders 30 is provided in which sub-atmospheric pressure is produced to create suction for withdrawing milk from the source, two vacuum heads being provided so that two cows may be milked at the same time. A transversely extending clamping member or bar 30a rests on the upper ends of the cylinders 30 and substantially midway of its ends is provided with an aperture to receive the upper threaded end of a vertically extending rod 31, the lower end of the rod 31 being screw-threaded into the housing top wall 19. Screw-threaded onto the upper end of the rod 31, a nut 32 is provided which may be tightened down for rigidly securing the cylinders to the housing top wall 19. In each of the cylinders 30 there is a piston 33, each of which is provided with a downwardly extending rod 34 which projects into the housing 16. Connected respectively to the lower ends of the piston rods 34, a pair of cross heads 35 are slidably received and guided respectively by tubular guide members 36 which are detachably secured to and depend from the housing top wall 19.

Figure 2:
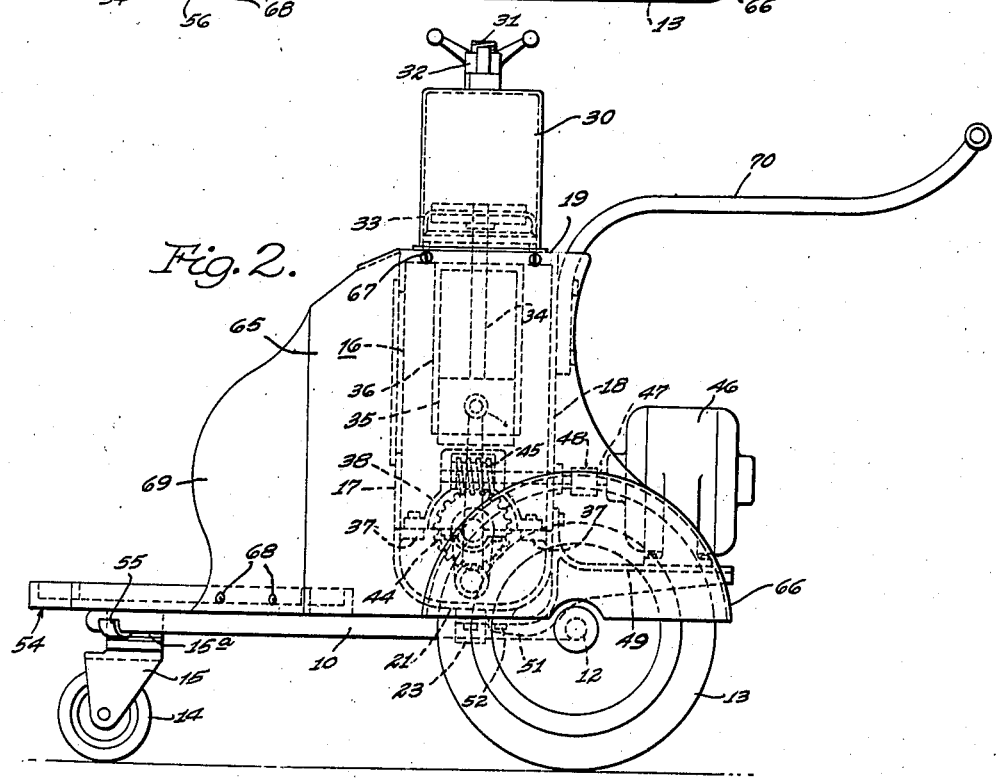
Figure 2 is a view shown in side elevation of the machine.

The lower housing section 26 is provided with internal flanges 37 which form a seat for a removable supporting member 38, preferably a casting having laterally spaced, aligning hollow bosses 39 for rotatably supporting a driven shaft 40. Opposite ends of the shaft 40 project externally of the bosses 39 and secured to these opposite ends of the shaft are cranks 42 which are connected by connecting rods 43 to the crossheads 35, the cranks 42 preferably being arranged 180 degrees apart. Secured to the shaft 40, between the bosses 39, a worm wheel 44 is driven by a worm gear 45 which is journaled in the upper portion of the casting 38, as shown more clearly in Figure 2 of the drawings.

Carried by the frame 10 and disposed rearwardly of the housing 16, power means 46 is provided for driving the worm gear 45, and although in the present instance the said power means is an electric motor, it will be understood that an internal combustion engine or any other portable power means may be used. The electric motor 46 has a forwardly extending drive shaft 47 which may be connected to the shaft of the worm gear 45 by a suitable coupling 48. A rearwardly extending bracket 49 supports the electric motor 46 and is provided with upwardly directed flanges 50 which are rigidly secured to the housing rear wall 18. The bracket 49 is also provided with forwardly extending horizontal portions 51 which may be rigidly secured to the housing bottom wall 21 by bolts 52 or by other suitable means.

Mounted on the frame 10 in advance of the housing 16 there is a platform or support 54 on which one or more milk containers or cans may be supported. A pair of spaced brackets 55 secured to the underside of the platform 54 may be provided to prevent lateral displacement of the platform, the brackets 55 being in the form of hook-like clamps partially surrounding the U-shaped frame 10, adjacent the forward end thereof. The platform 54 is elongated transversely of the frame 10 and is provided at its opposite ends with spaced offset portions 56 in the form of upturned flanges which are joined integrally by similar offset portions or upturned front and rear flange portions 57 and 58 respectively, thus providing a continuous flange bordering the edge of the platform. The upturned end flange portions 56 are rounded to conform to and receive containers C and the rounded flange portions 56 have substantially the same radii of curvature. Also, the front and rear flange portions 57, 58 are rounded, providing inwardly facing convex surfaces having the same radius of curvature but of larger radius of curvature than the radius of curvature of the end flange portions to provide retaining means for a relatively larger container, such as a standard milk can designated $C^1$.

Intermediate the ends of the platform 54 spaced offset portions designated generally by the numeral 60 cooperate with the end flanges 56 and the front and rear flanges 57 and 58 respectively to provide for the retention of a pair of containers at the ends of the platform or for a single, standard size milk container at substantially the center of the platform. The offset portions 60 are formed out of and are directed upwardly from the platform bottom wall, the offset portions 60 having curved or arcuate wall portions 61 having substantially the same center of radii as the flanges 56. Also the offset portions 60 are provided with curved or arcuate wall portions 62 which have the same center of radii as the flanges 57 and 58 but of smaller radii so as to leave spaces 63 between the walls 62 and the opposed flanges 57 and 58 respectively. As is well known, standard milk cans or containers have a reinforcing flange projecting below the bottom wall of the containers and the spaces 63 are provided to receive the said flanges thus to retain the can on the platform.

It will now be appreciated that I have provided for a portable milking machine, a container platform on which either a pair of relatively small containers may be supported or on which a single relatively large container may be supported and that said platform is not unduly long since the construction thereof provides common supporting surface for the pair of containers and the single container.

A pair of spaced upright panels 65 secure the housing 16 and the platform 54 together and formed out of these panels 65 are fenders 66 for the wheels 13. The panels 65 may be rigidly secured to the side walls respectively of the housing 16 by screws 67 and to the upturned flanges 56 of the container platform by screws 68. As shown in Figure 1, forward portions 69 of the panels are rounded to conform to the rounded flange portions 56 to which they are secured by the screws 68. For convenience in moving the portable machine from place to place, a Y-shaped handle 70 is provided having its ends rigidly secured by bolts and nuts 71 to the rear wall 18 of the housing 16. Extending rearwardly of the motor 46 the handle 70 is provided with a transverse handle portion 72 on which hand grips 73 are preferably provided.

In operation, it will be understood that sub-atmospheric pressure is alternately produced in the cylinders 30 for withdrawing milk from a source of supply thereof and for delivering the milk to containers. The cylinders 30 are connected to intermediate containers (not shown) which are connected to the source of supply of milk and to the containers usually by flexible tubing. The above mentioned intermediate containers and connecting tubing have not been shown in the present application since such structure forms no part of the present invention, but for a more detailed understanding of the structure, reference may be had to my co-pending application bearing Serial No. 293,379, filed September 5, 1939.

While I have shown and described my invention in detail, it is to be understood that the same is to be limited only by the appended claims for many changes may be made without departing from the spirit and scope of the invention.

What I claim is:

1. A portable milking machine comprising a U-shaped frame portion, a transverse tubular member rigidly secured to the ends of said U-shaped frame portion, rear wheels for said frame and having an axle journaled in said tubular member, a housing mounted on said frame portion forwardly of said tubular member, suction creating mechanism for communication with a source of milk and disposed with its major portion within said housing, a platform mounted on said frame portion in advance of said housing for supporting a milk container to which milk is delivered by said mechanism, and power means operatively connected to said mechanism and carried by said frame rearwardly of said housing.

2. A portable milking machine comprising, a frame supported by ground engaging wheels, a housing mounted on said frame, a platform mounted on said frame in advance of said housing for supporting a container, mechanism within said housing for operating milking apparatus adapted for withdrawing milk from a source thereof and delivering the milk to the container, power means carried by said frame and operatively connected to said mechanism, and spaced longitudinally extending side panels securing said platform and said housing together.

3. A portable milking machine comprising, a frame supported by front and rear wheels, a housing mounted on said frame, a platform mounted on said frame for supporting a container, mechanism carried by said housing and operable for withdrawing milk from a source thereof for delivery to the container, power means carried by said frame, means operatively connecting said power means and said mechanism, and spaced longitudinally extending upright panels secured to said housing on opposite sides thereof and having fenders formed out of said panels and extending over the rear wheels.

4. A portable milking machine comprising, a frame supported by front and rear wheels, a housing mounted on said frame, a platform mounted on said frame for supporting a container, mechanism carried by said housing and operable for withdrawing milk from a source thereof for delivery to the container, power means carried by said frame, means operatively connecting said power means and said mechanism, and a pair of spaced upright side panels disposed outwardly of opposite sides respectively of said housing, said panels securing said housing and said platform together and having fenders formed therein and extending over the rear wheels.

ORLEY R. FROST.